United States Patent [19]

Palm

[11] 3,860,697

[45] Jan. 14, 1975

[54] METHOD FOR RECOVERY OF ELEMENTAL SULFUR FROM LOW HYDROGEN SULFIDE SULFUR PLANT FEED GAS

[75] Inventor: John W. Palm, Tulsa, Okla.

[73] Assignee: Amoco Production Company, Tulsa, Okla.

[22] Filed: Apr. 23, 1973

[21] Appl. No.: 353,813

[52] U.S. Cl. .................................. 423/574, 423/576
[51] Int. Cl. ............................................ C01b 17/04
[58] Field of Search ..................... 423/573, 574, 576

[56] References Cited
UNITED STATES PATENTS

| | | | |
|---|---|---|---|
| 1,917,685 | 11/1933 | Bacon | 423/570 |
| 2,169,379 | 8/1939 | Barkholt | 423/576 |
| 2,664,345 | 12/1953 | Kohl et al. | 423/576 X |
| 3,399,970 | 9/1968 | Grekel et al. | 423/573 |
| 3,592,602 | 7/1971 | Palor | 423/574 |

Primary Examiner—G. O. Peters
Attorney, Agent, or Firm—Paul F. Hawley; Arthur McIlroy

[57] ABSTRACT

Claus-type processes used in the past to recover sulfur from low $H_2S$ acid gases have not been satisfactory because hydrocarbons and other impurities in the acid gas deactivate the Claus catalyst. A method is described which overcomes this problem. The method involves using only straight-through operation. Flame stability is achieved by preheating the feed gases and by burning supplemental fuel gas in a primary zone and then burning the acid gas in a secondary zone of the furnace. Two types of furnaces employing the invention are discussed.

4 Claims, 3 Drawing Figures

METHOD FOR RECOVERY OF ELEMENTAL SULFUR FROM LOW HYDROGEN SULFIDE SULFUR PLANT FEED GAS

The present invention relates to the catalytic conversion of $H_2S$-$SO_2$ mixtures into free sulfur. More particularly, it is concerned with relatively low $H_2S$-containing gases, e.g., 50 mol percent or less, which are normally subjected to the so-called "split flow" process because of the difficulty customarily encountered in maintaining a stable burner flame if all the gas is directed through the furnace.

BACKGROUND OF THE INVENTION

None of the methods used to date for processing low $H_2S$ sulfur plant feed gases is entirely satisfactory for current use. These methods include:

1. Split Flow
2. Split Flow with Preheating or with Fuel Gas Injection or with Sulfur Recycle
3. Direct Oxidation Any of these methods would be satisfactory if there were no hydrocarbons (or equivalent components) in the feed gas. However, practically all feed gases do contain hydrocarbons. Furthermore, these hydrocarbons may be of fairly high molecular weight, that is, high enough to be detected by adsorption on activated carbon at atmospheric temperature and pressure.

The heavy hydrocarbons cause catalyst deactivation and production of dark sulfur in the direct oxidation process. In variations of the split flow process, the sulfur quality has normally been satisfactory, but catalyst deactivation frequently occurs. This catalyst deactivation is probably caused by hydrocarbons in the acid gas which is bypassed to the catalytic reactor. Some split-flow plants require regeneration of the catalyst about once a year. Other split-flow plants regularly have low recovery, and the catalyst must be replaced as often as three times a year.

In the recovery of free sulfur from $H_2S$-containing gases, it is preferable to direct all of the $H_2S$ stream through the furnace together with sufficient air or oxygen to convert approximately one-third of the $H_2S$ into $SO_2$. This is for the reason that, in most instances, the hydrocarbons and/or other carbon-containing compounds present as impurities in the feed can be substantially completely burned in the furnace to $CO_2$ and water. This prevents such impurities from otherwise decomposing into free carbon, which deposits on the catalyst in the downstream reactors, eventually causing catalyst deactivation. In fact, I have observed that straight-through plants with a muffle furnace operating at 2,000°F are capable of being run with very little catalyst deactivation, even when the acid gas ($H_2S$ primarily contains a fraction of a mol of $C_5$ and higher hydrocarbons.

Not all sulfur recovery units, however, can employ this "straight-through" method. To do so, the $H_2S$ content of the feed gas should be at least 45 mol percent. With gases containing less than this amount, the split-flow process generally must be used in order to be able to maintain a stable burner flame and the proper furnace temperature. In the splitflow process, all of the $H_2S$ going into the furnace is burned to $SO_2$ while the remainder bypasses the furnace and is combined with the combustion products from the latter, following which the resulting mixture is converted into free sulfur over bauxite or a similar catalyst in a known manner.

The straight-through method is not applicable to low $H_2S$-content feeds because only a third of the $H_2S$ is converted to $SO_2$ in the furnace. Thus, because of the oxygen deficiency and low temperature, it is ordinarily impossible to maintain combustion of such feeds in the furnace.

While the split-flow process serves as a means of handling low $H_2S$-containing feeds, it has not met with unqualified success. One of the chief difficulties has resulted from the fact that the $H_2S$ feed to a split-flow plant, practically without exception, contains hydrocarbons; and, although those present in the portion of the feed passing through the furnace are destroyed, the two-thirds of the stream bypassing the furnace causes the feed to the catalytic reactors to become contaminated with hydrocarbons, which tend to deposit on the catalyst in the form of carbon or nonvolatile carbon-containing compounds and ultimately result in deactivation of the catalyst. The catalyst must then either be regenerated or replaced every few months to a year, depending, of course, on the hydrocarbons in the feed. Generally with regeneration the catalyst does not regain its original activity although it sometimes can be brought back to acceptable levels, at least for the first few treatments, after which it must be replaced. Operation of a sulfur plant at decreased efficiency is not only objectionable from an economic standpoint, but the time has arrived when environmental regulations will no longer permit operation of such plants at recoveries of 60 to 85%.

With exceptionally low $H_2S$-containing feeds, e.g., streams containing 20% $H_2S$ or less, it has been proposed to add a supplemental fuel to the burner feed in order to stabilize the flame. However, it is not feasible to do this in a straight-through plant. Test data have shown that hydrocarbons in a sulfur plant feed gas do not burn completely unless sufficient temperature and oxygen concentration are used. For example, in one test at a temperature of 1,898°F, the combustion product gas contained about 0.14 mol % methane, 0.001 mol % ethane, 0.002 mol % propane and 0.003 mol % ethylene. The oxygen level required to oxidize the hydrocarbons completely is not compatible with the oxygen level required to oxidize hydrogen sulfide to sulfur. In order to burn the hydrocarbons completely, the oxygen (air) feed rate would have to be increased by a factor of about three, and the hydrogen sulfide would be burned substantially to sulfur dioxide. Thus it is generally not possible in a straight-through furnace to burn the hydrogen sulfide to produce sulfur and still burn the hydrocarbons completely. In other words, sulfur plants have a limited tolerance for hydrocarbons in the feed gas; whereas a low concentration of hydrocarbons can be tolerated, it is not feasible to add supplemental fuel gas to the burner feed in order to stabilize the flame in straight-through operation because the resulting larger amount of unburned hydrocarbons would cause catalyst deactivation.

BRIEF DESCRIPTION OF THE INVENTION

I have now discovered that low $H_2S$-containing streams that normally would have to be subjected to the split-flow process can be fed to a muffle furnace in the straight-through method essentially in the same fashion as high $H_2S$-containing feeds are handled. This is made possible by the fact that I can achieve good flame stability by burning supplemental fuel, e.g., natural gas, ethane, etc., in a primary zone and then burning the acid gas in a secondary zone of the furnace. Generally, it is preferable to preheat the air and acid gas to 400°F, or thereabouts. To burn supplemental fuel (residue gas), it is necessary to provide for a special combustion zone in which there is enough oxygen to burn the hydrocarbons completely.

DESCRIPTION OF THE DRAWINGS

My invention will be further illustrated by reference to the accompanying drawings in which.

DESCRIPTION OF A SPECIFIC EMBODIMENT

Referring again to FIG. 1, muffle furnace 2, as well as downstream equipment (not shown), is preferably heated up by first flowing air and fuel gas into burner 4 via lines 6 and 8, respectively. Although any hydrocarbon can be used as fuel, I prefer to use a stream of constant composition such as the stream generally referred to as residue gas or sales gas in gas processing plants. During start-up of the unit, inert gas such as $CO_2$, nitrogen, steam, etc., is bled into the system through lines 10 and 6 in order to moderate the flame temperature so that the reactors can be more rapidly brought up to operating temperature without damage to the furnace refractory. A procedure for this technqiue is taught by L. E. Childers, et al., in U.S. Pat. No. 3,366,455. When the downstream catalytic reactors reach the proper temperature, the flow of inert gas through line 10 is discontinued and acid gas flow into the system via lines 12 and 14 is commenced. All of the residue gas is mixed with part of the acid gas entering the system through line 12 and burned in the forward portion of combustion zone 16, designated A. The amount of acid gas entering the burner via line 12 and fed to zone A is controlled to result in a low $H_2S/SO_2$ ratio in zone A so that complete combustion of the hydrocarbons occurs. The remaining acid gas is fed to zone B. Hydrocarbons and monoethanolamine from the sweetening tower in this acid gas, as long as they are moderate in amount, are expected to react with water and $SO_2$ in zone B at a temperature of about 2,000°F–2,200°F. Thus, they do not severely harm the catalyst as they do in conventional split-flow procedures where this stream is fed directly to the catalytic reactor. The $H_2S/SO_2$ ratio should be controlled in both zones. The proper range of $H_2S/SO_2$ ratio in zone A will be determined during plant operation and will depend on variations in acid gas composition. An $H_2S/SO_2$ molar ratio of about 0.2 or less is desirable. However, corrosive $SO_3$ will be formed if all of the $H_2S$ were converted to $SO_2$, so enough residual $H_2S$ should be maintained to prevent $SO_3$ formation when the acid gas composition changes unexpectedly.

The acid gas fed to zone B through line 14 may be injected into the furnace through a single nozzle or through a group of two-four nozzles which are suitably connected to a distribution manifold.

Figure 1:
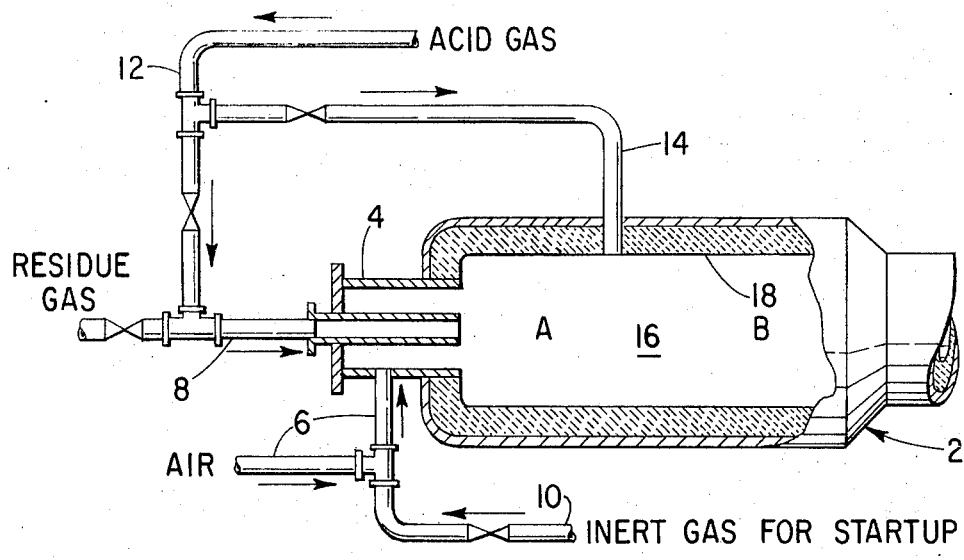
FIG. 1 is a sectional view of a muffle furnace having a single burner employing a two-step, straight-through sulfur plant combustion system.
Figure 2:
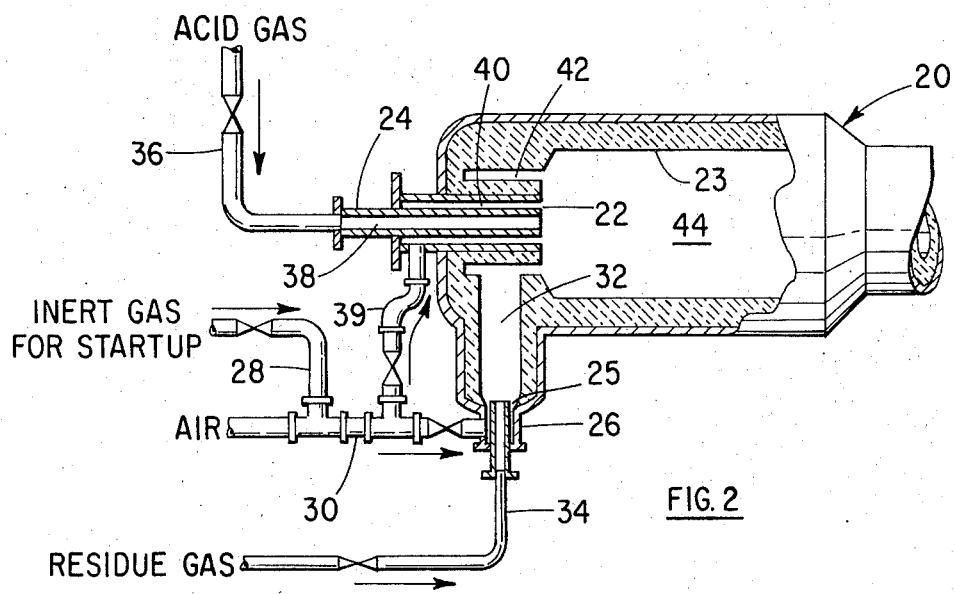
FIG. 2 is a sectional view of an alternate design in which a two-burner system is employed whereby an air-hydrocarbon mixture is burned in the first burner with acid gas being burned in the second burner.
Figure 3:
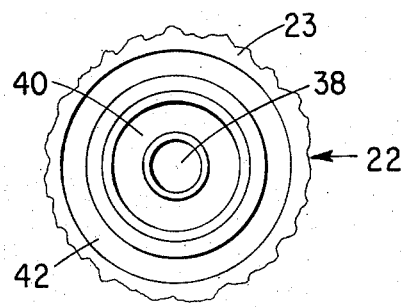
FIG. 3 is a cross sectional view of burner 22, shown in FIG. 2.

In FIG. 2, muffle furnace 20 is equipped with two burners, 25 and 22. Residue gas supplied by line 34 is mixed in burner 25 with air supplied through line 30 and then burned in combustion zone 32. Start-up of the unit is carried out in the same manner as described above in connection with FIG. 1, with inert gas fed through line 28 being blended with air in line 30, which then enters burner 25. When the desired temperature is reached, flow of inert gas is discontinued, acid gas flow is started into burner 22 via line 36 and channel 38, and air is fed to burner 22 through line 39. Burner 22 is arranged so that the emerging mixture of gas and air is immediately mixed with the hot effluent gas from chamber 32. While various methods of accomplishing this mixing will be apparent to those skilled in the art, one suitable method is indicated by the configuration of FIG. 2 wherein the air entering burner 22 emerges from annular slot 40 while combustion products containing excess air from chamber 32 enter via annulus 42. With the design shown in FIG. 2 when burning a sweet residue gas in burner 25, there is no risk of forming $SO_3$ in either combustion chambers 32 or 44. This possibility is eliminated by the two-burner arrangement where sweet gas is burned by itself using excess air, and the resulting effluent is mixed with the effluent of acid gas burner 22. The hot combustion products from zone 32 increase the temperature in zone 44 sufficiently to result in stable combustion therein with straight-through operation. With the design shown in FIG. 2, temperature control can be used to select the air rate to burner 25, with the $H_2S/SO_2$ ratio in the tail gas being used to select the total air rate to both burners.

If the design in either FIGS. 1 or 2 is used, the acid gas can be preheated, typically to 400°F for example, by indirect heat exchange with the first reactor effluent and in this way the amount of sweet gas burned is reduced. Other sources of heat such as steam can also be used for preheating.

The table below shows process flow rates and temperatures for a 23-long-ton/day, conventionally-designed sulfur recovery unit compared with a plant employing the features of my invention.

TABLE

| | Conventional Split-Flow Design | Present Invention |
|---|---|---|
| Acid gas, mol/hr | | |
| $H_2O$ | 12.2* | 12.87** |
| $N_2$ | 2.2 | 0.02 |
| $CO_2$ | 139.4 | 169.50 |
| $H_2S$ | 74.0 | 60.24 |
| $CH_4$ | 4.0 | 2.04 |
| Total | 231.8 | 244.67 |
| Total, lb/hr | 9003 | 9778 |
| *Original design acid gas | | |
| ** Current operating feed gas | | |
| Sweet gas to furnace, mol/hr | | |
| $N_2$ | 0 | 0.22 |
| $CH_4$ | | 14.65 |
| $C_2H_6$ | | 0.73 |
| $C_3H_8$ | | 0.12 |
| Total | 0 | 15.72 |
| Total, lb/hr | 0 | 268 |
| Air to burn acid gas, mol/hr | | |
| $H_2O$ | 4.63 | 3.85 |
| $N_2$ | 149.30 | 123.85 |
| $O_2$ | 39.69 | 32.82 |

TABLE-Continued

|  | Conventional Split-Flow Design | Present Invention |
|---|---|---|
| Total | 193.62 | 160.52 |
| Total, lb/hr | 5536 | 4609 |
| Air to burn fuel gas | | |
| Total, mol/hr | 0 | 154.67 |
| lb/hr | 0 | 4441 |
| Total feed (air plus gases) to | | |
| SRU, mol/hr | 425.42 | 575.58 |
| lb/hr | 14,539 | 19,096 |
| Total feed (air plus gases) to | | |
| furnace, mol/hr | 286.34 | 575.58 (a,b) |
| Adiabatic flame | | |
| Mol/hr | 274.31 | 569.28 |
| Lb/hr | 9137 | 19,096 |
| °F | 2446 | 2000 |
| Approximate theoretical sulfur recovery | | |
| Long-tons/day | 23.4 | 18.5 |
| Percent of feed sulfur | 92.2 | 89.5 |

NOTES TO TABLE a. When using the configuration of FIG. 1, the acid gas is divided as follows:

|  | Mols/hr | Lb/hr | % |
|---|---|---|---|
| To burner | 112.335 | 4889 | 50 |
| To downstream of burner | 112.335 | 4889 | 50 |
|  | 244.67 | 9778 | 100 |

The adiabatic flame from the burner (zone A) and from the muffle furnace (zone B) is:

|  | Zone A Effluent | Acid Gas Bypass to Zone B | Zone B Effluent |
|---|---|---|---|
| Rate, lb/hr | 14167 | 4889 | 19097 |
| Rate, mols/hr |  |  |  |
| $H_2$ | 0.60 |  | 0.60 |
| $H_2O$ | 75.32 | 6.43 | 81.82 |
| CO | 2.67 |  | 3.69 |
| $N_2$ | 242.69 |  | 243.41 |
| $CO_2$ | 98.59 | 84.75 | 183.34 |
| $H_2S$ | 3.16 | 30.12 | 34.30 |
| $SO_2$ | 18.85 |  | 17.83 |
| COS | 0.48 |  | 0.48 |
| $CS_2$ | 0.50 |  | 0.50 |
| $S_2$ | 3.31 |  | 3.31 |
| $CH_4$ | 0 | 1.02 | 0 |
| Total | 446.17 | 122.335 | 569.28 |
| Approximate adiabatic flame temp., °F | 2542 | (110) | 2000 | b. When using the configuration of FIG. 2 an operating temperature for burner 25 is selected (about 2400° to 2500°F) and the air feed is divided as follows:

|  |  |  |
|---|---|---|
| Temperature, °F | 2400 | 2500 |
| Air rate, mols |  |  |
| Burner 25 |  |  |
| To burn fuel gas | 154.67 | 154.67 |
| To moderate temperature | 125.8 | 110.7 |
| Total to burner 25 | 280.47 | 265.37 |
| Burner 22 | 34.72 | 49.82 |
| Total, both burners | 315.19 | 315.19 |

The total effluent from zone 32 is given below:

|  |  |  |
|---|---|---|
| Temperature, °F | 2400 | 2500 |
| Total effluent from zone 32, mols |  |  |
| $H_2O$ | 39.28 | 38.92 |
| $N_2$ | 219.41 | 207.77 |
| $O_2$ | 25.73 | 22.65 |
| $CO_2$ | 16.47 | 16.47 |
| Total | 300.89 | 285.81 |

Although the data in the above table show a higher daily sulfur production for the split-flow plant than the sulfur recovery unit employing my invention, it is to be pointed out that the amount of $H_2S$ in the feed in the first case was approximately 14% higher. Also, while the theoretical percent $H_2S$ converted to free sulfur was about 3% higher in the split-flow plant, it should be stressed that over extended periods plants using the process of my invention are able to maintain a higher actual average conversion to free sulfur and require fewer changes of catalyst.

It will be, of course, apparent to those skilled in the art that a number of modifications may be made in the invention I have described above without departing from the scope thereof. For example, the operating conditions can be changed in accordance with requirements of the particular feed gas. In gas processing plants the impurities in the acid gas are such that a temperature of about 2,000°–2,200°F in zone B of FIG. 1 or in combustion zone 44 of FIG. 2 is sufficient to combust the impurities in the acid gas. However, in refineries and various types of chemical plant operations this stream often contains not only hydrocarbons but also other impurities such as ammonia, mercaptans, disulfides and cyanides which require higher temperatures such as 2,400°–2,800°F, for satisfactory combustion. The amount of residue gas burned and the corresponding air rate can be increased when processing these streams to reach the required combustion temperature.

I claim:

1. In a process for the recovery of free sulfur from a feed stream containing less than 45 mol % $H_2S$ and contaminated with hydrocarbons, the improvement comprising mixing a portion of said stream with a hydrocarbon gas and air and burning the resulting mixture in the forward portion of a combustion zone, said air being present in an amount sufficient to convert the hydrocarbon gas to $CO_2$ and $H_2O$ and to provide an $H_2S/SO_2$ molar ratio not greater than about 0.2 whereby the presence of $SO_2$ is suppressed, discharging the hot combustion products thus formed into the rearward portion of said combustion zone where they are mixed with the remainder of said feed stream at a temperature ranging from about 2,000°F to about 2,800°F, withdrawing an effluent from said rearward portion containing $H_2S$ and $SO_2$ in an approximate molar ratio of 2:1 and substantially free from hydrocarbons, removing elemental sulfur from said effluent, and thereafter reacting the $H_2S$ and $SO_2$ in the resulting sulfur denuded effluent in contact with a catalyst for the reaction to produce sulfur in a known manner.

2. The process of claim 1 wherein said air and said portion of said feed stream are preheated to from about 300° to about 600°F prior to introduction thereof into said combustion zone.

3. In a process for the recovery of free sulfur from a feed stream containing an amount of $H_2S$ insufficient to maintain combustion in a straight through process and contaminated with hydrocarbons, comprising
  1. mixing said feed stream with air,
  2. simultaneously and separately burning a gaseous hydrocarbon with air in an amount in excess of that necessary to convert said gaseous hydrocarbon into $CO_2$ and water,
  discharging the products from steps 1 and 2 into a noncatalytic reaction zone where free sulfur is formed at a temperature ranging from about 2,000° to about 2,800°F, withdrawing an effluent from said reaction zone containing $H_2S$ and $SO_2$ in a molar ratio of about 2:1, removing the sulfur there-from, and thereafter reacting the $H_2S$ and $SO_2$ in the resulting sulfur-denuded effluent in contact with a catalyst for the reaction to produce sulfur in a known manner.

4. The process of claim 3 wherein the air and said stream are preheated to from about 300 to about 600°F prior to step 1.

* * * * *

UNITED STATES PATENT OFFICE
CERTIFICATE OF CORRECTION

PATENT NO. : 3,860,697
DATED : January 14, 1975
INVENTOR(S) : John W. Palm

It is certified that error appears in the above-identified patent and that said Letters Patent are hereby corrected as shown below:

Column 1, line 54, a closing parentheses should be placed after "ily", which are the final letters of the word primarily from the previous line.

Claim 1, line 10, in column 6, "$SO_2$" should read -- $SO_3$ --.

Signed and sealed this 27th day of May 1975.

(SEAL)
Attest:

RUTH C. MASON
Attesting Officer

C. MARSHALL DANN
Commissioner of Patents
and Trademarks